US008151432B2

(12) United States Patent
Daniels et al.

(10) Patent No.: US 8,151,432 B2
(45) Date of Patent: Apr. 10, 2012

(54) CONVEYOR BELT SPLICING SYSTEM AND METHOD

(75) Inventors: William J. Daniels, Orland Park, IL (US); William R. Wawczak, Glen Ellyn, IL (US); Pan Yim Ng, Chicago, IL (US)

(73) Assignee: Flexible Steel Lacing Company, Downers Grove, IL (US)

( * ) Notice: Subject to any disclaimer, the term of this patent is extended or adjusted under 35 U.S.C. 154(b) by 1024 days.

(21) Appl. No.: 12/045,669

(22) Filed: Mar. 10, 2008

(65) Prior Publication Data

US 2009/0223023 A1 Sep. 10, 2009

(51) Int. Cl.
*B23P 17/00* (2006.01)
(52) U.S. Cl. ........ 29/525.01; 29/407.1; 29/700; 29/798; 269/289 MR; 269/900
(58) Field of Classification Search ............... 29/407.09, 29/407.1, 525.01, 700, 798; 269/289 MR, 269/900
See application file for complete search history.

(56) References Cited

U.S. PATENT DOCUMENTS

| | | | |
|---|---|---|---|
| 4,344,213 A * | 8/1982 | Pray | 29/243.5 |
| 5,368,214 A | 11/1994 | Schick | |
| 5,524,808 A | 6/1996 | Vogrig | |
| 5,644,836 A | 7/1997 | Schick | |
| 6,216,851 B1 | 4/2001 | Mitas et al. | |
| 7,765,662 B2 * | 8/2010 | McKown et al. | 29/27 C |
| 2005/0230278 A1 | 10/2005 | Vogrig et al. | |
| 2006/0026802 A1 * | 2/2006 | Musil et al. | 24/37 |
| 2006/0096838 A1 | 5/2006 | Buchko | |
| 2008/0010785 A1 | 1/2008 | Richardson et al. | |
| 2008/0052889 A1 | 3/2008 | Atkins et al. | |

FOREIGN PATENT DOCUMENTS

WO WO2007-143120 12/2007

OTHER PUBLICATIONS

PCT International Search Report cited in corresponding PCT Application No. PCT/US2009/036133 dated May 19, 2009.

* cited by examiner

*Primary Examiner* — Derris Banks
*Assistant Examiner* — Azm Parvez
(74) *Attorney, Agent, or Firm* — Fitch Even Tabin & Flannery LLP

(57) ABSTRACT

A system of splicing ends of conveyor belts is provided that enables a splice installer to install splices in an easy and fast manner. In one aspect, the system includes a base having a recess extending therealong configured to fit fastener members of conveyor belt fasteners therein so that the fastener members do not shift as the belt fasteners are attached to the belt ends. In another aspect, removable rivet guide blocks are provided which significantly reduces the weight of an alignment bar having upper plate members of the belt fasteners secured thereto. In addition, the removable guide blocks allow the installer to secure the upper plate members to the alignment bar without having to deal with the heavy weight of multiple guide blocks fixed thereto. A method of splicing belt ends is also provided which includes indexing the removable guide block along the alignment bar during for riveting operations.

8 Claims, 13 Drawing Sheets

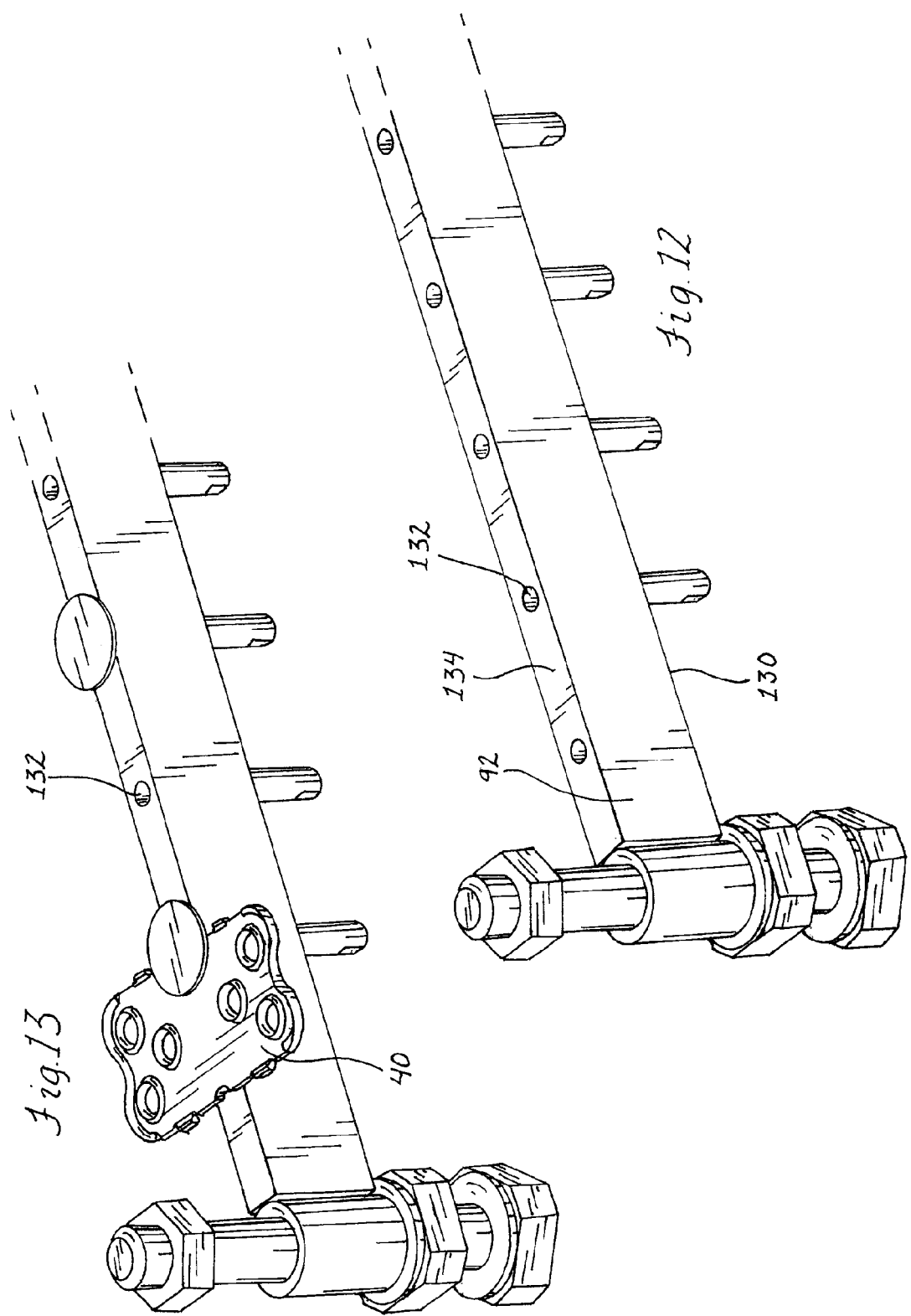

CONVEYOR BELT SPLICING SYSTEM AND METHOD

FIELD OF THE INVENTION

The invention relates to a system and method for splicing conveyor belt ends together and, more particularly, to an installation tool and a rivet guide apparatus for a belt fastener installation tool used to splice belt ends together.

BACKGROUND OF THE INVENTION

Installing conveyor belt fasteners for splicing belt ends together is generally a fairly labor intensive operation. For instance, applicant's assignee herein has a commercial belt fastener installation tool called the MBRTA tool. As is known, conveyor belt fasteners are typically of either the hinge type that include upper and lower plates secured to one belt end and interconnected by arcuate hinge loops that are interfit with arcuate hinge loops of identical fasteners secured to the other belt end for receiving a hinge pin therethrough, and of the non-hinge type where the upper and lower plates of the fasteners are sized to span the adjacent belt ends for forming a rigid splice therebetween. The MBRTA tool is configured for use with non-hinge type or solid plate fasteners that have their upper and lower plates attached to the belt ends by rivets.

The MBRTA tool includes a channel base having an anvil upper surface such as formed on separate anvil plates to which the lower plate members of the non-hinged, solid plate fasteners are secured. To do this, a belt splice installer needs to insert several hold down clips between adjacent lower plate members, and then inserts a cam rod through aligned holes of the clips projecting below the web of the base member. For instance, with seven plate members connected in a strip, the installer has to insert four hold down clips between the adjacent fastener plates in the strip. With the cam rod inserted through the clip holes, the splice installer then turns the cam rod handles thereby tightly pulling down the clips which, in turn, pulls the fastener plate members down tightly onto the anvil plates fastened to the web of the tool base. The rotated cam rod is secured in place by inserting a lock pin in aligned holes of the cam rod handle and the tool handle. Generally, there will be a pair of cam rods that extend from either end of the base for splicing belts with a relatively long belt width.

After securing the lower plate members to the base, an alignment bar and guide block assembly is next employed for securing the upper plate members thereto. Rivet guide blocks have a block body of either elastomeric or steel material and are used to guide the driving of rivets through the rivet bores thereof. The rivet blocks are positioned with the rivet bores aligned with underlying apertures of the upper and lower plate members so that the rivets driven out from the rivet bores are then driven through the aligned plate apertures and the belt material therebetween. Because the block bodies are relatively heavy and are fixed to the alignment bar, the heavy weight of the alignment bar and guide block assembly makes manipulation thereof a more difficult task for the splice installer than is desired. In this regard, the splice installer needs to turn over the alignment bar and guide block assembly adjacent the base for being aligned with the bottom plate members that are secured to the base, as previously described. Thereafter, the installer places the upper plate members on the guide blocks and uses retainers to secure the upper plate members to the alignment bar with the guide blocks fixed thereon. After the upper plate members are all secured to the alignment bar and guide block assembly, the installer needs to lift the assembly and carry it to be placed out of the way so that the belt ends can be clamped to the tool. Again, lifting and carrying the alignment bar and guide block assembly is made more difficult than is desired because of the heavy weight thereof.

For clamping the belt ends to the tool base, a pair of square shaped tubular clamp bars are employed. The clamp bars each include a pair of screw clamp handles at either end thereof that are received in threaded openings formed in the base. Initially, one of the clamp bars is used for centering the first belt end over the lower plate members secured to the base. For this purpose, the screw handles of one of the clamp bars are inserted into threaded openings at either end of the tool base generally in a central area thereof slightly offset to the side where the other belt end is to be clamped to the tool. The first belt end is then slid over the lower plate fasteners and engaged against the central clamp bar. A problem that has been identified is that the lower plate fasteners, as well as the anvil plates, present raised catch points relative to the upper surface of the web immediately adjacent thereto making it more difficult to slide the belt ends into position.

Once the first belt end is abutted against the clamp bar extending generally centrally across the tool base as previously described, the other clamp bar is then connected to the tool base via the threaded clamp handles thereof at the side of the base having the guide surface along which the first belt end is slid into engagement with the central clamp bar. The splice installer then rotates the clamp handles to drive the clamp bar into clamping engagement with the first belt end. To make sure that the first belt end does not move during riveting operations, the clamp bar is provided with apertures so that the splice installer can drive nails through the tube walls of the clamp bar and into the belt thereunder. Nailing of the belt end after clamping is an extra undesirable step during installation of the belt splice.

With the first belt end clamped to the tool base, the splice installer next rotates the screw clamp handles of the central clamp bar in a releasing direction so the clamp handles are removed from the threaded openings in which they were received for removal of the clamp bar from the tool so that the second belt end can be slid into engagement with the clamped first belt end. As is apparent, threading and unthreading the screw clamp handles of the center clamp bar into and out from the threaded openings in the tool base is undesirably time intensive.

After the center clamp bar has been removed, the second belt end to be spliced to the first belt end is slid into engagement with the end edge of the clamped first belt end. Next, the previously removed clamp bar is connected to the tool base by threading the clamp handles thereof into threaded openings at the side of the base at which the second belt end is located, and then the clamp handles are turned in a tightening direction to drive the clamp bar into clamping engagement with the second belt end so that both belt ends are now clamped in place on the tool base with the end edges abutting each other. Again, the splice installer drives nails through the clamp bar and the second belt end thereunder so that the second belt end does not shift during riveting operations.

The installer then retrieves the heavy alignment bar and guide block assembly including the upper plate members secured thereto and threads the screw handles thereof into central threaded openings in the web of the tool base. Tightening nuts are then turned so that the upper fastener members are tightly engaged against the belt ends. With the rivet blocks and upper plate fastener members all secured in place, rivets are loaded into the bores of the rivet blocks and then driven through the aligned apertures of the fastener plate members and the belt ends therebetween for securing the belt fasteners to the belt ends and splicing the belt ends together.

As is apparent, there are several time consuming and difficult steps during the installation of the belt fasteners to the belt ends. Accordingly, a system and method of splicing belt ends together would be desirable that is easier and faster. More particularly, a belt fastening installation tool that is easier and faster to use would be desirable, particularly with respect to securing of the bottom plate members of the conveyor belt fasteners to the tool. In addition, an easier way to secure the upper plate members of the conveyor belt fasteners to an alignment device would be desirable.

SUMMARY OF THE INVENTION

In accordance with one aspect of the invention, a system for splicing conveyor belt ends together is provided that is significantly simpler in how the fastener members, such as lower plate members of solid plate fasteners, are secured to the tool. In this regard, the tool has an elongate recess and locating projections that extend into the recess on either side thereof for being received in edge recesses and between edge projections of belt fastener members having scalloped end edges with the fastener members received in the tool elongate recess. In this manner, the present belt splicing system takes advantage of the scalloped edges of the fastening members to keep the fastening members substantially stationary as the belt fasteners are attached to the belt ends. Further, the splice installer need only place the fastener members into the tool recess, and does not need to install hold down clips and rotate and secure cam rods as in the prior tool. In essence, the splice installer need only drop the fastener members into the elongate recess so the locating projections mate with the scalloped edges of the fastener members to secure the fastener members to the tool. Accordingly, the present splicing system is much simpler, easier and faster for a splice installer in terms of how the fastener members are secured to the tool.

In another aspect of the invention, an installation tool for splicing belt ends together is provided including an alignment bar having locating posts projecting upwardly therefrom, and a guide block having locating bores in which the posts are removably received. In this manner, the guide block can be easily placed onto and removed from the alignment bar for being indexed therealong. This allows the splice installer to use only a single guide block for attaching all of the belt fasteners to the belt ends. Another option is that if there are two splice installers such as for wide belts, each can have a removable guide block that they utilize for attaching belt fasteners from either end of the tool toward the middle thereof. By not having the guide blocks fixed to the alignment bar, the splice installer also gets a better view of the splice area between the belt ends. Further, the removable guide block also allows the upper plate fastener members to be secured to the alignment bar without any guide blocks mounted thereto. This makes it easier for the splice installer to move the alignment bar since the weight of multiple, heavy guide blocks is no longer carried thereon as in the prior tool.

A method of splicing belt ends together is also provided and includes securing upper plate fastener members to an alignment bar without a heavy rivet guide device on the alignment bar and indexing a removably mounted rivet guide block along the alignment bar for sequentially riveting plate fastener members to the belt ends. In a preferred form, the lower plate fastener members are secured to the tool base by placing the lower plate fastener members in a recess extending along the tool base.

BRIEF DESCRIPTION OF THE DRAWINGS

FIG. 12 is a perspective view of the alignment bar showing the bottom surface thereof with spaced aperture therealong;

FIG. 13 is a perspective view of the alignment bar showing retainers received in the apertures with the circular head of one of the retainers holding one of the upper plate fastener members against the bottom surface of the alignment bar;

DETAILED DESCRIPTION OF THE PREFERRED EMBODIMENTS

Figure 1:
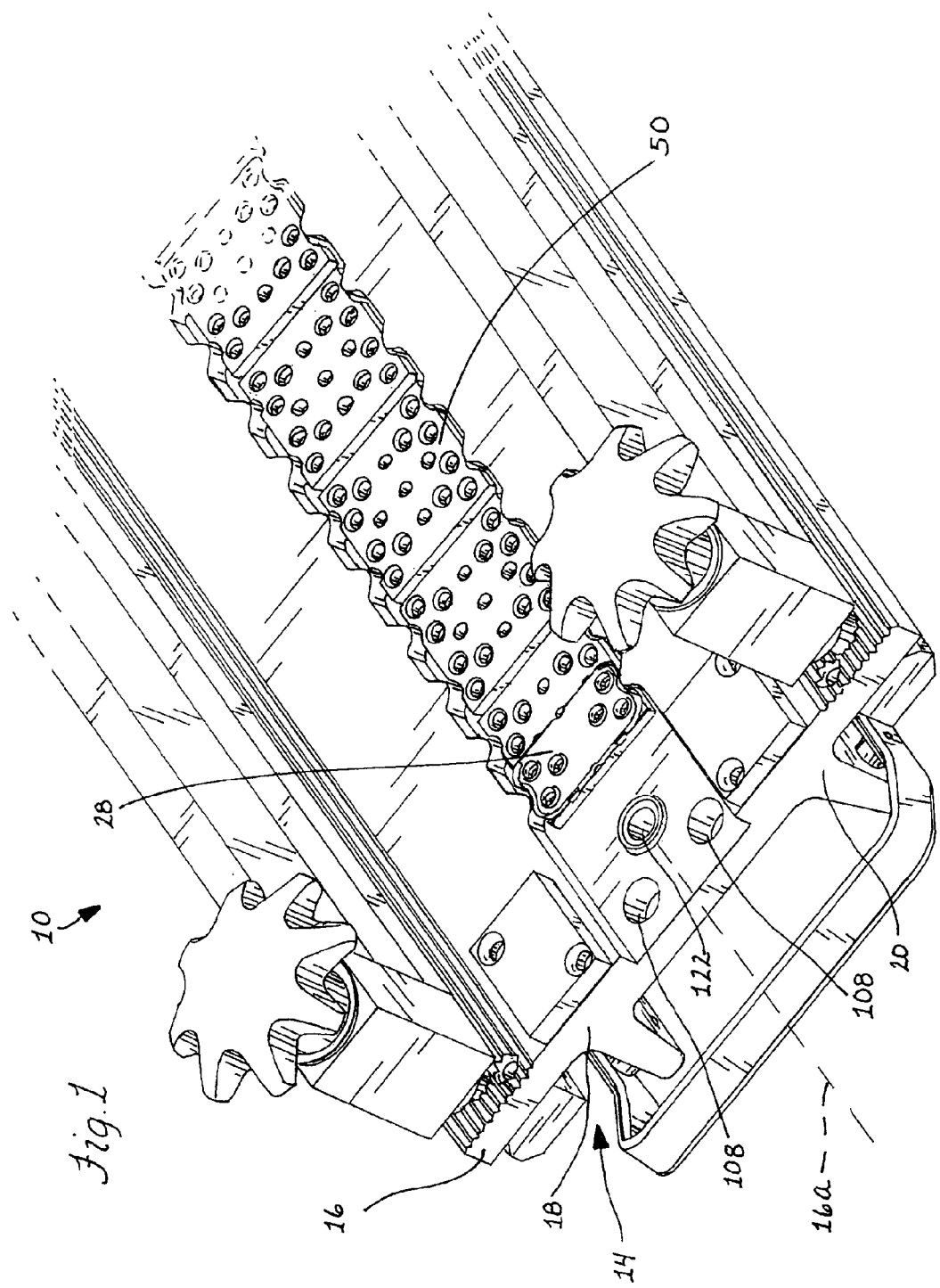
FIG. 1 is a perspective view of an installation tool for splicing conveyor belt ends together in accordance with the present invention showing a tool base having an upwardly facing, elongate recess extending centrally therealong.
Figure 2:
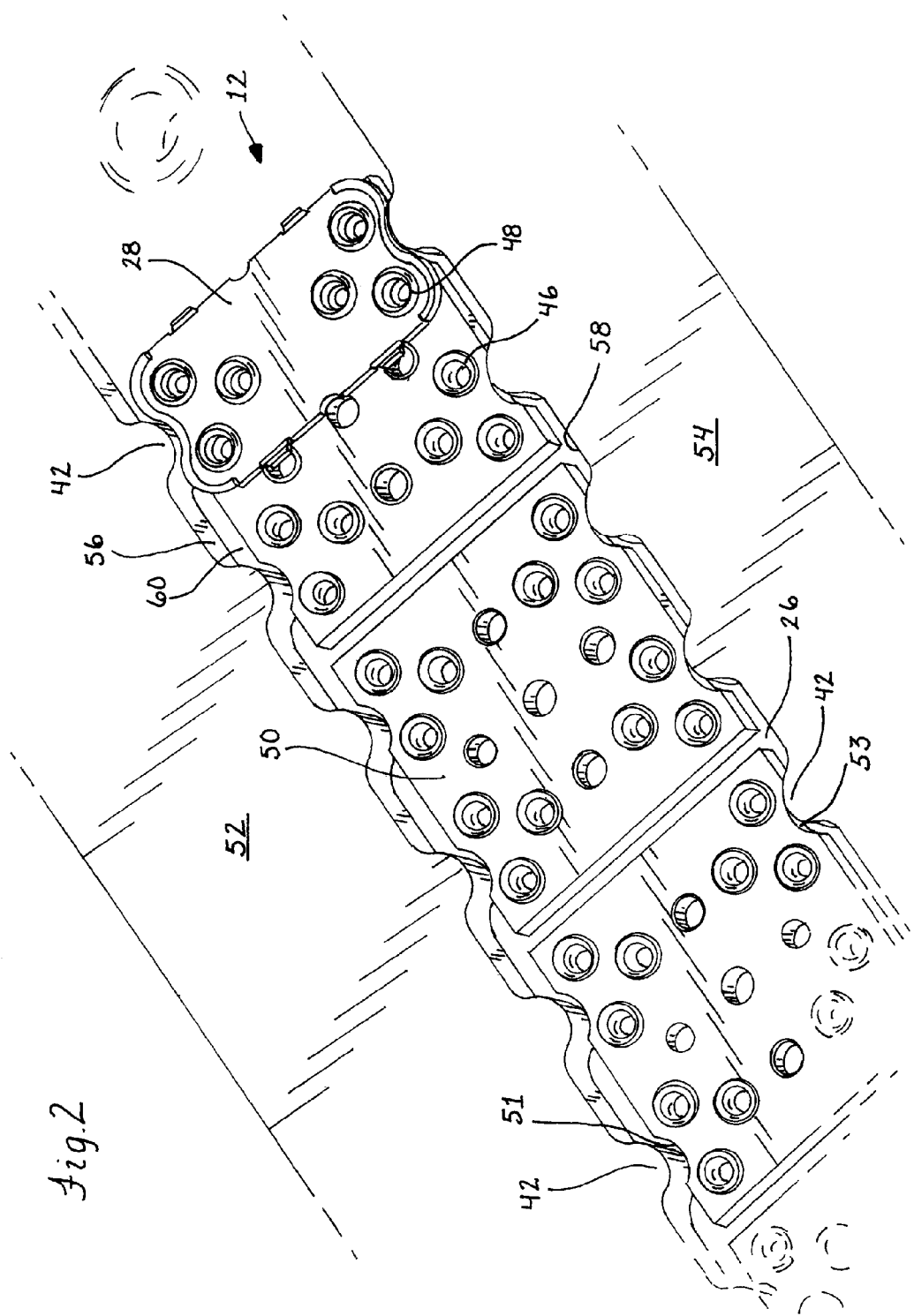
FIG. 2 is an enlarged, perspective view of the tool base of FIG. 1 showing locating projections extending into the elongate recess and anvil plates fastened in the recess and having notch recesses for receiving the locating projections therein.
Figure 3:
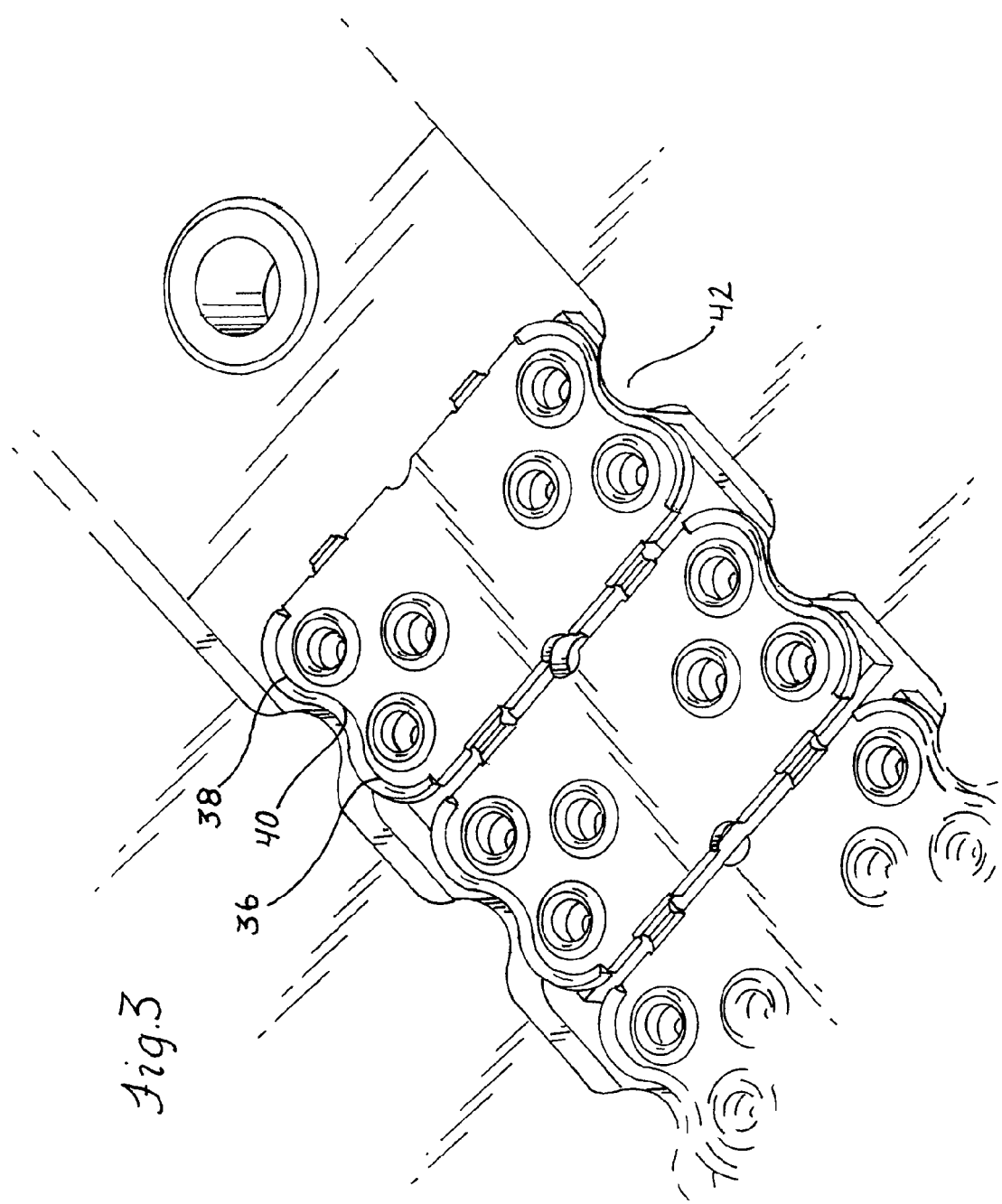
FIG. 3 is an enlarged, perspective view similar to FIG. 2 showing a strip of lower plate fastener members including scalloped end edges received in the tool recess with the locating projections extending into edge recesses formed between edge projections of the lower plate fastener members.
Figure 5:
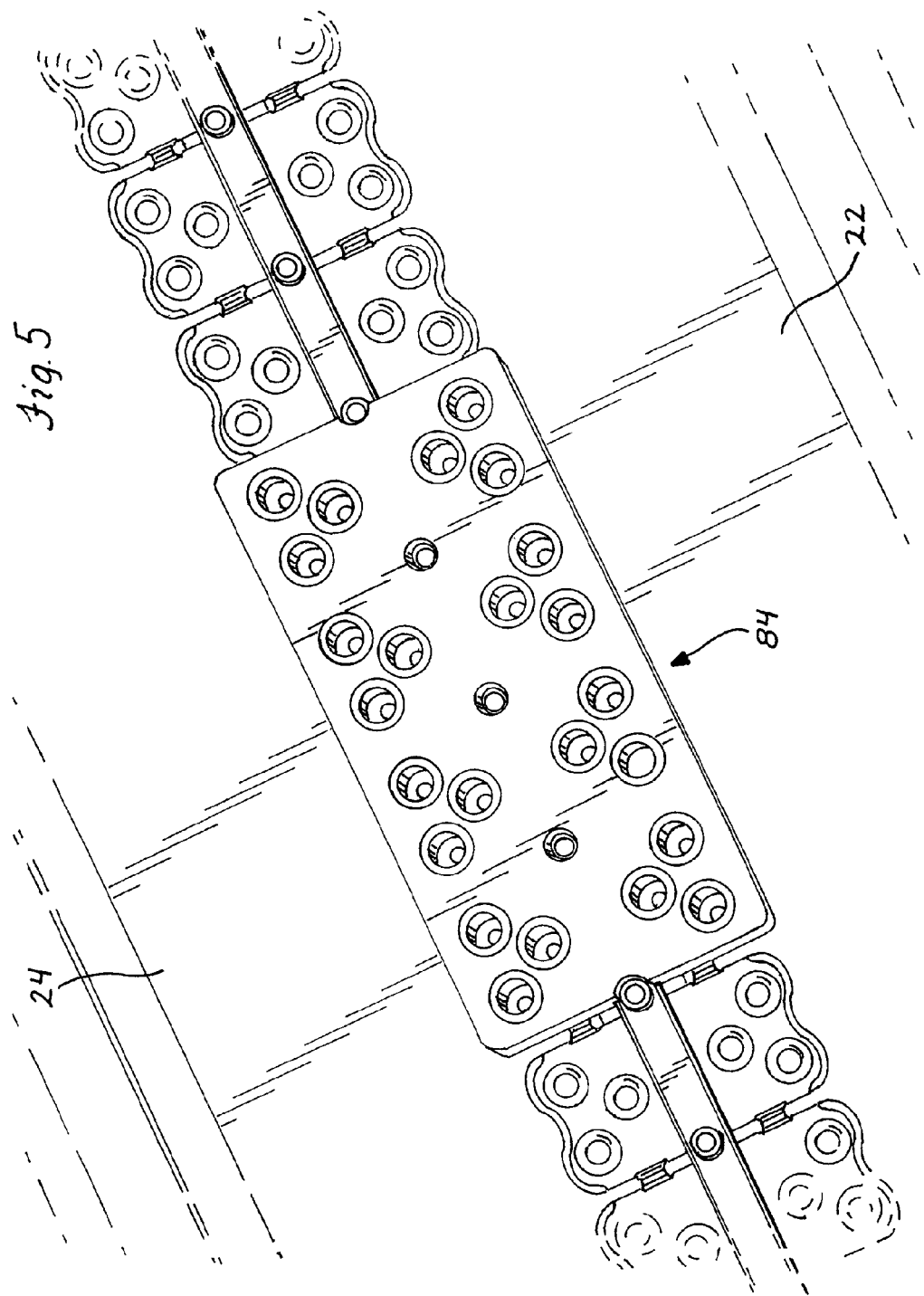
FIG. 5 is a plan view showing a guide block having locating bores that are sized for removably receiving locating projections of an alignment bar therein.

In FIGS. 1-3, an installation tool 10 for a conveyor belt splicing system including conveyor belt fasteners 12 is shown. The installation tool 10 has a base 14 such as in the form of an extruded channel base member having an upper web 16 with a pair of depending legs 18 and 20. The tool 10 is preferably configured to attach non-hinged type belt fasteners, such as the illustrated solid plate rivet fasteners 12, to belt ends 22 and 24 (FIG. 5). For this purpose, the tool 10 has an elongate recess 26 that can be formed in the generally horizontal, upper web wall 16 with the recess 26 facing upwardly. This allows a belt splice installer to quickly and easily secure the belt fasteners 12, and more particularly the lower plate members 28 thereof, to the tool 10. In this regard, all the splice installer has to do is basically drop the lower plate members 28 into the upwardly facing recess or nest 26 to snugly fit therein so that the lower plate members 28 are secured to the web 16 of the tool base 14 and kept substantially stationary as the belt fasteners 12 are attached to belt ends 22 and 24 (FIG. 5), as by riveting. As is apparent, this is an easy and speedy procedure for securing belt fasteners, and specifically lower plates thereof to an installation tool when compared to such procedures for prior tools.

As best seen in FIGS. 2 and 3, the preferred lower plate members 28 have end edges 30 and 32 that have a scalloped configuration so that there is a central edge recess 34 between a pair of side projections 36 and 38 at each end edge 30 and 32. Upper plate members 40 (FIG. 7) of the belt fasteners 12 can have a similar scalloped edge configuration. To secure the scalloped lower plate members 28 to the tool base 14, locating projections 42 can extend into the recessed nest 26 from either side thereof in a direction transverse to the lengthwise extent of the recess 26. The locating projections 42 are configured to be received in the edge recesses 34 of the lower plate members 28 at both ends thereof so as to restrict movement of the lower plate members 28 both longitudinally and laterally in the elongate recess 26. As illustrated, the fastener plate edge recess 34 has an arcuate, concave configuration and the fastener plate edge projections have an arcuate, convex configuration, while the locating projections 42 have a convex, arcuate configuration to have a substantially mating fit in the concave, arcuate edge recesses 34 of the lower plate members 28. Thus, the tool 10 herein advantageously utilizes the both scalloped edges 30 and 32 of each of the lower plate members 28 to secure the lower plate members 28 to the tool base 14 for riveting thereof to the belt ends 22 and 24.

With the illustrated rivet belt fasteners 12, the lower plate members 28 are placed on a bottom anvil surface 44 located in the tool recess 26 which have rivet head forming bushings or cups 46 thereon for forming lower heads on rivets driven through apertures 48 of the plate members 28. While the anvil surface 44 can be formed integrally with the base member 14, preferably separate, generally flat anvil plates 50 including the anvil surface 44 are provided having the cups 46 raised therefrom, as shown in FIGS. 1 and 2. The illustrated anvil plates 50 have notch recesses 51 and 53 along either side thereof so that the locating projections 42 fit therein with the plates 50 in the recess 26. The anvil plates 50 can be sized to support a pair of the lower plate members 28 thereon that are connected to each other, such as in a strip of seven lower plate members 28. With the lower plate members 28 properly positioned on the anvil plates 50, the anvil cups 46 will fit into the plate apertures 48 and the plate edge recesses 34 will be aligned with the corresponding notch recesses 51 and 53 of the anvil plates 50 therebelow.

The anvil plates 50 are fastened in the recess 26 so as to be below the immediately adjacent belt guide surfaces 52 and 54 extending along either side of the elongate recess 26. In this regard, the recess 26 has substantially vertical, shoulder side walls 56 and 58 extending between bottom surface 60 of the recess 26 to which the anvil plates 50 are fastened and the adjacent, raised guide surfaces 52 and 54. The vertical side walls 56 and 58 are sized to provide the recess 26 with sufficient depth so that with the lower plate members 28 placed in the recess 26 on the anvil plates 50 fastened therein, the lower plate members 28 do no project above the raised, belt guide surfaces 52 and 54, and preferably are slightly recessed therefrom. Accordingly, it is preferred that the height of the side walls 56 and 58 be the same or slightly greater than the thickness of the lower plate members 28 and the anvil plates 50 thereunder taken together. By way of example and not limitation, the thickness of the lower plate members 28 can be approximately 0.085 inches, the thickness of the anvil plates 50 can be approximately 0.188 inches, and the height of the side walls 56 and 58 can be approximately 0.350 inches. In this manner, neither the anvil plates 50 or the lower plate members 28 thereon interfere with sliding of the belt ends 22 and 24 along the raised guide surfaces 52 and 54 and over the lower plate members 28 for clamping of the belt ends 22 and 24 to the tool base 14, as will be described in more detail hereinafter.

The locating projections 42 can be formed integrally with the channel base member 14 along the side walls 56 and 58 that extend along either side of the elongate recess 26, as shown in FIGS. 1-3. This requires that the projections 42 be machined into the base member 14 after extrusion thereof. In an alternative form shown in FIG. 4, locating projections 62 are formed integrally with a separate anvil plate 64 that is fastened in the recess 26 formed in the web wall 16 of the tool base member 14. As can be seen, the anvil plate 64 has a stepped construction with a central, substantially flat, lower anvil portion 66 recessed from a pair of substantially flat, upper guide portions 68 and 70 on either side of the lower anvil portion 66 so that with several anvil plates 64 fastened in the recess 26, the anvil plates 64 cooperate to form an elongate recess 71 in which the lower plate members 28 are received. The portions 66 and 68 are interconnected by substantially vertical, shoulder side wall portions 72 and 74 on which the locating projections 62 are formed. With the anvil plate 64 fastened in the recess 26, the side wall portions 72 and 74 can be disposed adjacent to or engaged with the now flat side walls 56 and 58 of the web 16 since they no longer include the projections 42 thereon. With the locating projections 62 integrally formed with the separate anvil plate 64, the base member 14 no longer has to be machined after extrusion thereof for forming locating projections integrally therewith. Instead, the stamped anvil plate 64 has the locating projections 62 punched therein.

In either case, it can be seen that the preferred and illustrated locating projections 42 and 62 are sized so as to extend for the full height of the respective side walls 56 and 58, and 72 and 74, from which they are formed to curve outwardly therefrom in a direction transverse to the lengthwise extent of the respective elongate recesses 26 and 71. The projections 42 have a longer height than the projections 62 since the projections 42 are sized to extend into both the lower plate edge recesses 34 and the anvil notch recesses 51 and 53 aligned therebelow, whereas since the projections 62 are integrally formed with the separate anvil plate 64, the projections 62 need only be sized to fit into the lower plate edge recesses 34.

To accommodate the flat guide portions 68 and 70 of the anvil plate 64 so that upper, belt guide surfaces 76 and 78 of the guide portions 68 and 70 are substantially flush or at the same height as or level with the adjacent upper, belt guide surfaces 52 and 54 of the web wall 16 of the tool base 14, shallow recesses 80 and 82 are formed web wall surfaces 52 and 54 extending along either side of the central, elongate recess 26 in which the flat anvil portion 66 is secured. The recesses 80 and 82 are of depth substantially the same as the thickness of the anvil guide portions 68 and 70. In this manner, the substantially flush adjacent belt guide surfaces 52 and 76, and 54 and 78, present a generally continuous smooth surface for sliding of the belt ends 22 and 24 thereover without any raised catch points or interfering structure over which the belt ends 22 and 24 have to be lifted.

Figure 6:
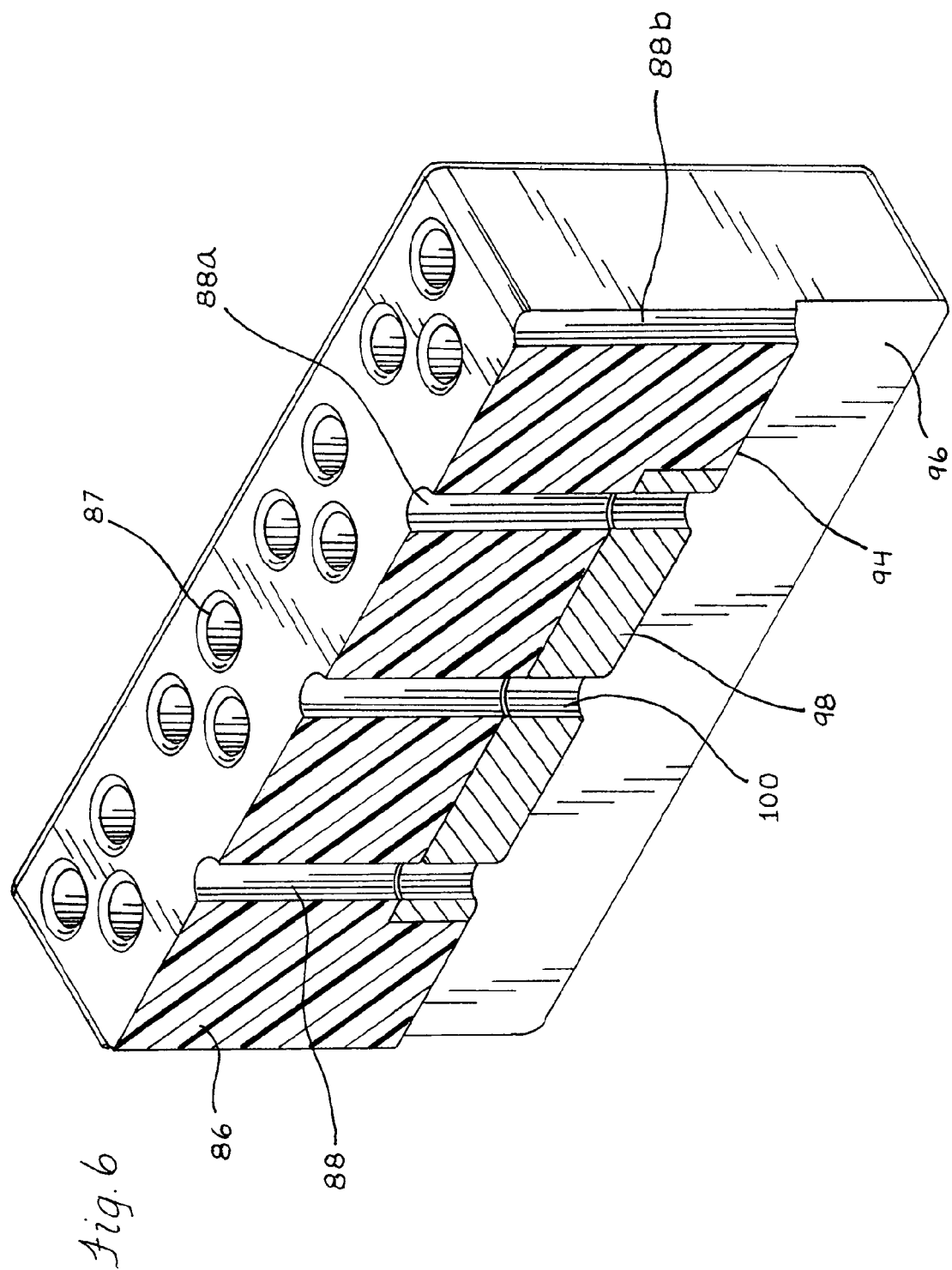
FIG. 6 is a sectioned perspective view showing half of the guide block and a metal insert that provides low friction metal surfaces in the locating bores of the guide block.

Referring next to FIGS. 5 and 6, a guide device in the form a guide block 84 for guiding driven rivets that attach the preferred conveyor belt fasteners 12 to the belt ends 22 and 24 is shown. The illustrated guide block 84 has a block body 86 of elastomeric material, although the guide block 84 could also be of metallic material such as steel where a power tool is used to drive the rivets. In the prior tool, several guide blocks were fastened to an alignment bar as by bolting so that the guide block and alignment bar assembly was very heavy and difficult for a splice installer to easily maneuver as has previously been discussed.

The preferred and illustrated guide block 84 herein has locating bores 88 formed in the block body 86 that are sized in clearance with locating pins or posts 90 of elongate alignment bar 92 so that the guide block 84 is readily removable from the alignment bar 92 without the need for tools for this purpose. Instead, a splice installer can simply lift the block 84 off the alignment bar 92, and specifically the locating posts 90 thereof as well as place the block 84 back thereon by fitting the locating posts 90 in the locating bores 88 so that there is a toolless removable connection between the guide block 84 and the alignment bar 92. By way of example and not limitation, the locating bores 88 can have an effective diameter of approximately 0.265 inch, and the locating posts 90 can have a diameter of approximately 0.250 inch, to provide a clearance of approximately 0.015 inch with the posts 90 removably received in the bores 88.

Figure 7:
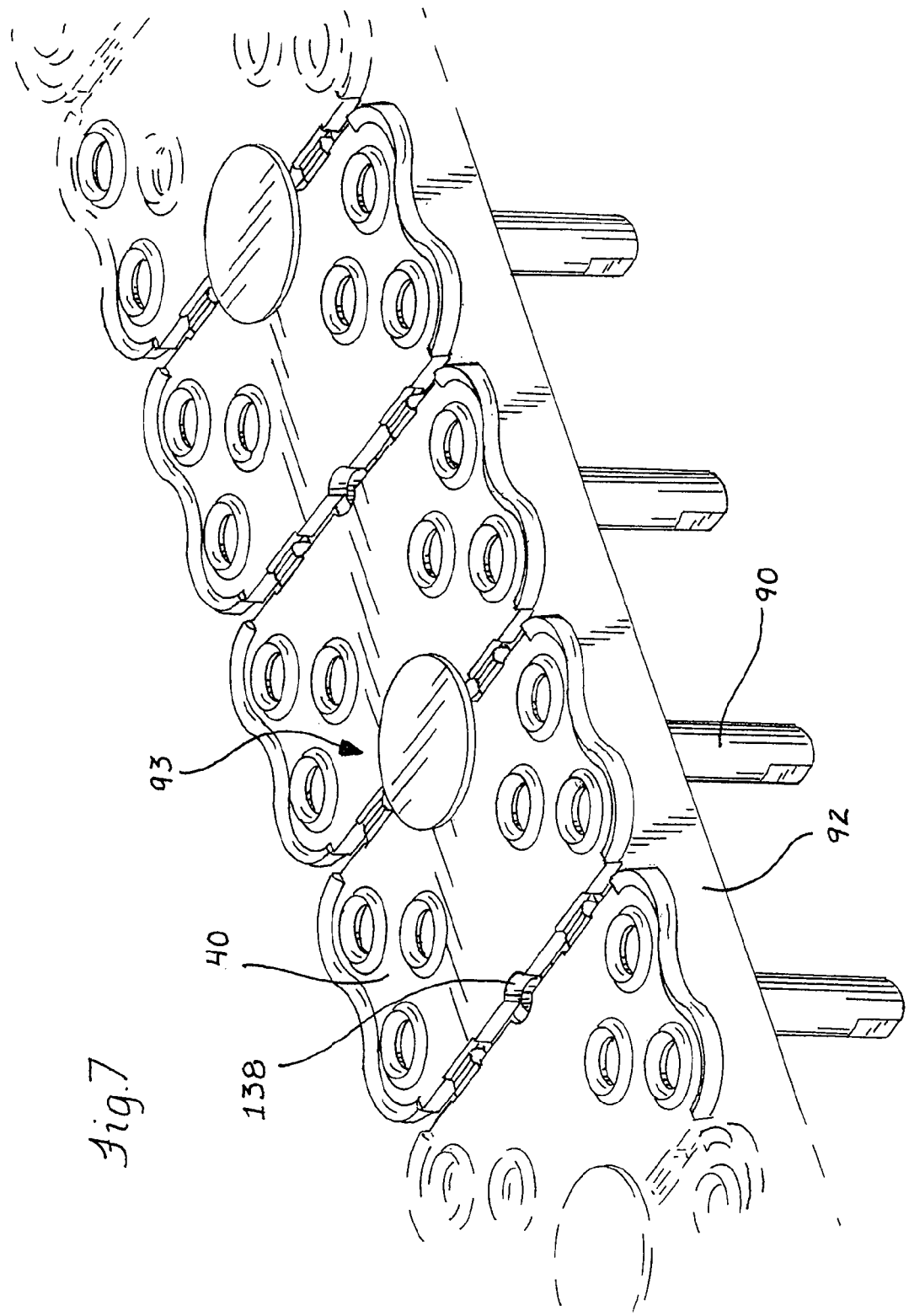
FIG. 7 is a perspective view of the alignment bar and upper plate fastener members secured to the bottom of the alignment bar with retainers.

The toolless removable connection between the guide block 84 and alignment bar 92 provide several advantages during installation of the belt fasteners 12. As shown in FIG. 7, the splice installer no longer has to connect the upper plate members 40 to the alignment bar 92 with retainers 93 while dealing with the heavy weight of the guide blocks fastened thereto. Instead, the splice installer can simply have only the relatively light weight alignment bar 92 without heavy guide blocks connected thereto while the installer secures the upper plate members 40 to the bar 92. This makes the process of securing the upper plate members 40 to the bar 92, as well as to the tool base 14 as will be described hereinafter, much easier since the splice installer need only manipulate relatively light weight components, i.e., the alignment bar 92 and upper plate members 40 secured thereto.

Another advantage is that during the riveting operations, the splice installer has a better view of the splice area since rather than having several large guide blocks overlying the splice area with the present tool 10, the installer will only have a single guide block 84 overlying the area where riveting is taking place. This provides the installer with a good view of the splice area around the removable guide block 84 so that they can easily see if the clamped belt ends 22 and 24 remain properly abutted and have not otherwise shifted during riveting operations. To rivet the belt fasteners 12 to the belt ends 22 and 24, the installer can index a single one of the guide blocks 84 down along the alignment bar 92 after riveting of a first set of fasteners 12 therewith for a subsequent riveting operation for a second set of rivets thereunder. This reduces the number of expensive rivet blocks 84 needed for each tool 10. Currently, it is contemplated that two rivet blocks 84 can be provided with each tool 10 so that with particularly long splices for greater width belts 22 and 24, e.g. 72 inch width belts, two installers can start at either side of the belt ends each with their own guide block 84, and work their way from the opposite ends of the tool 10 toward the middle thereof indexing their guide block 84 along the bar 92 to speed up the installation process.

As shown, the locating bores 88 are formed centrally in the block body 86 between sets of rivet guide bores 87 and extend upwardly in the block body 86 from interior base 94 of a central, downwardly opening slot 96 of the block body 86. The slot 96 is sized to removably receive the alignment bar 92 therein so that the posts 90 carried thereon can be removably fit into the locating bores 88. The locating bores 88 can include full locating bores 88a as well as partial locating bores 88b formed at the opposite ends of the block body 86 to open thereto. The illustrated guide block 84 has three full bores 88a and a pair of partial bores 88b all of which removably receive locating posts 90, as shown in FIG. 5. The full bores 88a have an annular configuration so that they extend fully around the locating posts 90 while the partial end bores 88b only extend partially around the posts 90 and thus serve as stops that resist shifting of the block body 86 along the bar 92 in a direction beyond the post 90 in the partial bore 88b and exposed therefrom.

When the block body 86 is of elastomeric material, the elastomeric block body 86 preferably includes a metal insert 98 that provides metal surfaces 100 in the locating bores 88 and, more specifically, in the full locating bores 88a, as can be seen in FIG. 6. The metal surfaces 100 provide for low friction engagement with the locating posts 90 as the guide block 84 is removed from the alignment bar 92 and replaced back thereon. The illustrated insert 98 has a generally dog-bone configuration for being press-fit into a similar configured cut-out in, adjacent to and between the locating bores 88a in the block body 86.

Referring next to FIGS. 8-11, the belt fastener installation procedure using the installation tool 10 herein will be described in further detail. For centering the first belt end 22 over the lower plate fastener members 28 secured in the tool base recess 26, a clamp bar 102 is mounted to the tool base 14 to extend generally centrally therealong. The clamp bar 102 is of a much more robust and stiff configuration than the prior tubular square clamp bars and has an inverted T-shaped cross-sectional configuration similar to the clamp bar disclosed in applicants' assignees PCT publication WO 2007/143120 A2, which is incorporated as if reproduced in its entirety herein. The clamp bar 102 has handles 104 at either end thereof for turning threaded shafts 106 depending therefrom. Rather than have to thread these shafts into threaded openings generally adjacent the center of the web wall 16 of the tool base member 14, the present tool base member 14 has oversized, unthreaded openings 108 for quick receipt and removal of the threaded shafts 106 into and out therefrom.

Figure 8:
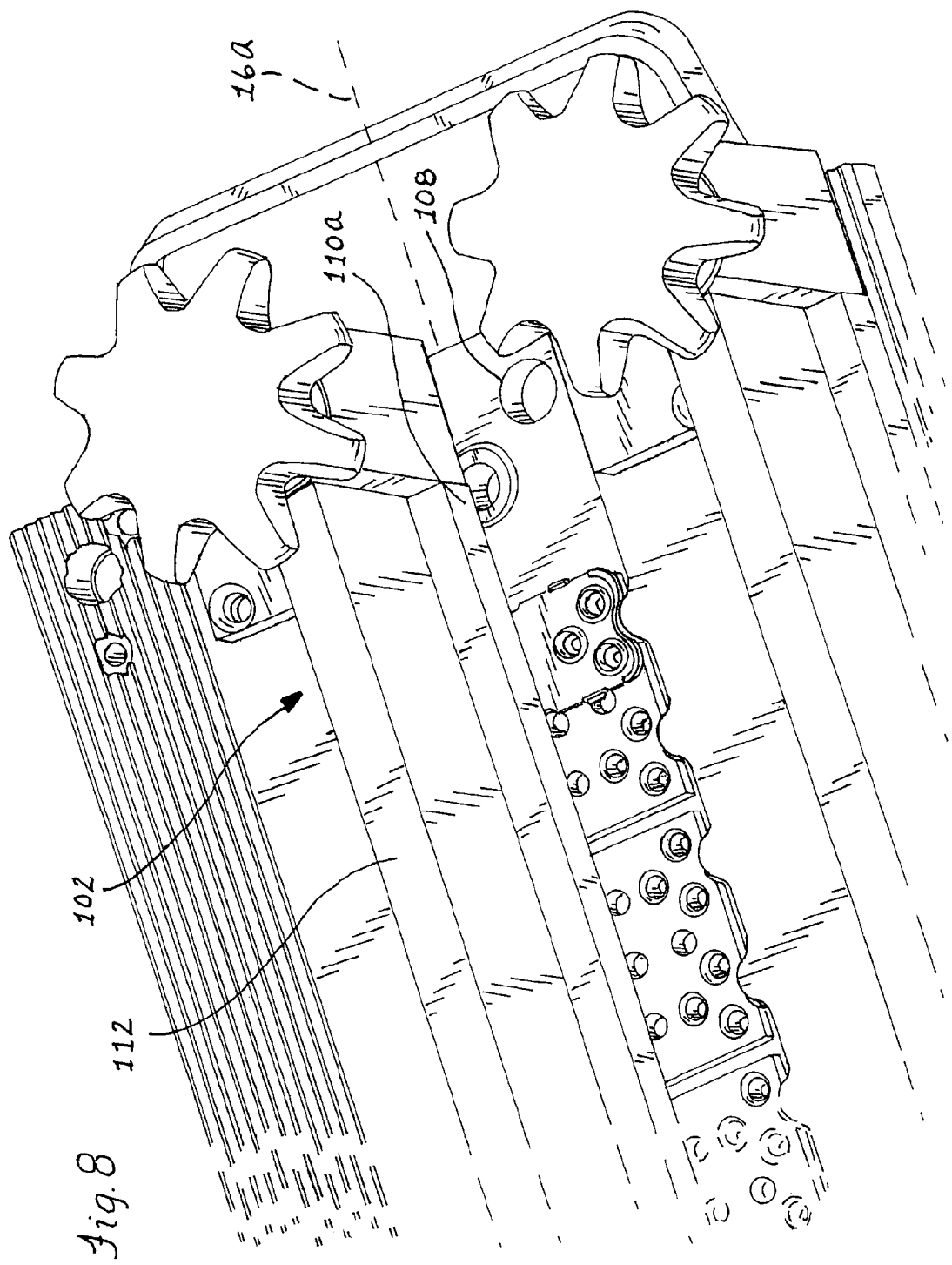
FIG. 8 is a perspective view of the installation tool showing one of the clamp bars connected to the tool base to extend generally centrally therealong.

There are two pair of unthreaded openings 108, one pair on either side of longitudinal center line 16a of the web wall. The spacing of the openings 108 from the center line 16a is coordinated with the size of the horizontal clamping foot portion 110 extending beyond the clamp bar vertical leg portion 112 on either side thereof so that with the shafts 106, for instance, first placed in the pair of openings 108 adjacent the belt guide surface 52, the end edge 110a of the foot portion 110 extending toward the first belt end 22 to be slid into engagement therewith will be aligned over the center of the lower plate members 28 secured in the recess 26, as shown in FIG. 8. Thereafter, the first belt end 22 is slid across the flat and smooth belt guide surface 54 and over the lower plate members 28 recessed therebelow so the plate members 28 do not interfere with bringing the end edge 22a of the belt end 22 into abutting engagement with the end edge 110a of the clamping foot portion 110.

Figure 9:
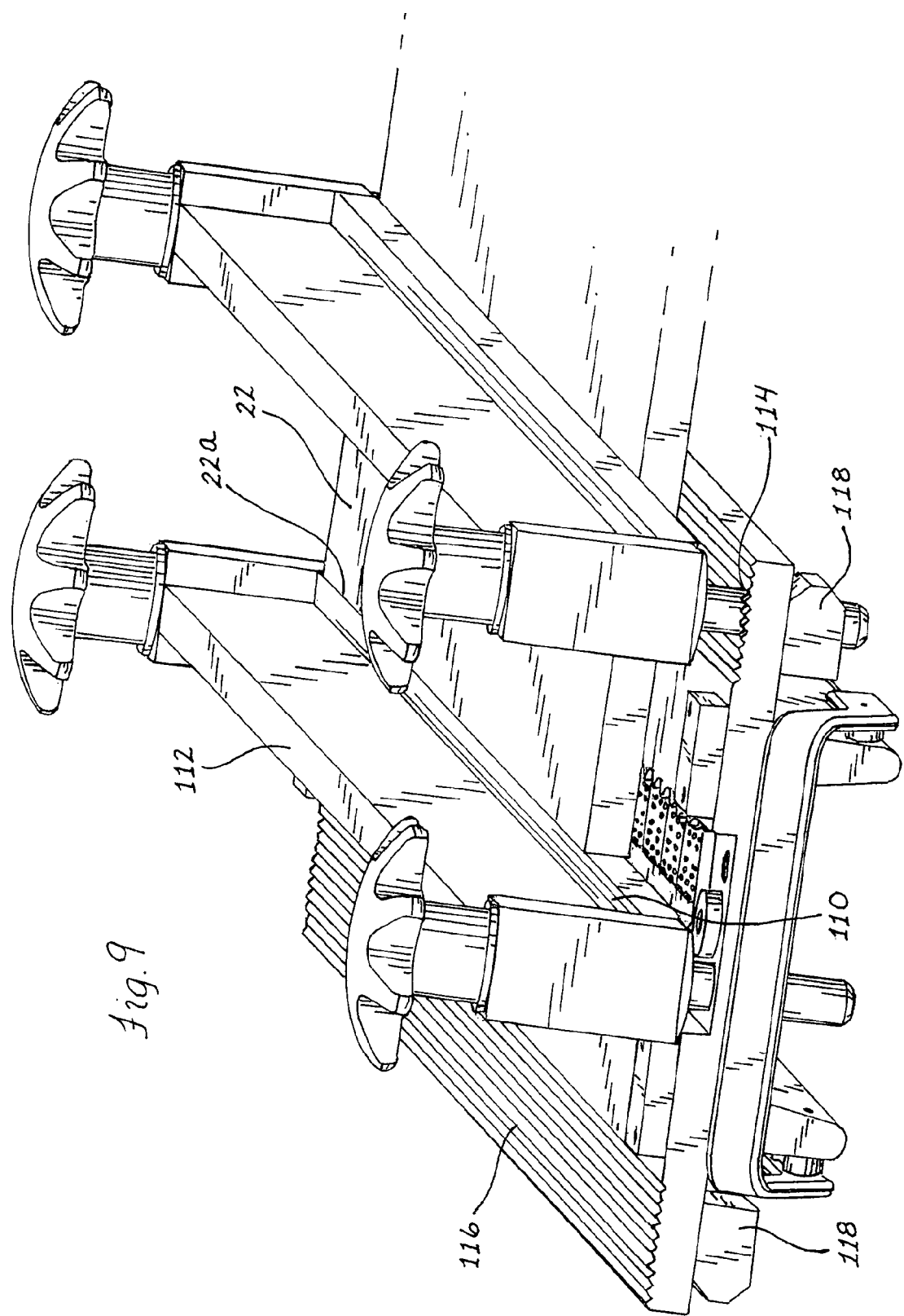
FIG. 9 is a perspective view showing a first belt end clamped under one of the clamp bars on one side of the tool and abutting the centrally located clamp bar.

With the first belt end 22 abutted against the clamp bar 102, the other identical clamp bar 102 is connected to the tool base 14 via threading of the threaded shafts 106 thereof into a pair of threaded openings 114 formed in the web wall 16 at the side of the tool base 14 from which the first belt end 22 was fed to the tool 10 for centering over the lower plate members 28 as described above. As can be seen in FIG. 9, these threaded openings 114 are formed in both outboard portion of the web wall 16 each having an upper clamping or gripping surface 116 adjacent to the respective smooth belt guiding surfaces 52 and 54. The belt clamping surface 116 has a serrated or otherwise roughened configuration to provide a more secure clamping of the belt ends 22 and 24 to the base 14, and specifically the web wall 16 thereof. With the serrated clamping surface 116 and stiffer, more robust clamp bars 102, the clamp force provided to the belt ends 22 and 24 is sufficient to secure the belt ends 22 and 24 against shifting during belt fastener installation so that the splice installer no longer needs to undertake the separate, time consuming step of nailing the belt ends and clamp bars to each other as with the prior tool and clamp bars thereof.

The first belt end 22 is clamped to the tool base 14 by turning the clamp handles 14 to advance the threaded shafts 106 through nut blocks 118 fixed to the bottom of the outboard portions of the web wall 16, as shown in FIG. 9. The advancement of the threaded shafts 106 brings the bottom of the clamp foot portion 110 into tight engagement with the upper surface of the belt end 22 which pushes the bottom surface of the belt end 22 tightly against the serrated surface 116 so that the belt end 22 is tightly clamped between the clamp foot portion 110 and the serrated surface 116. Thereafter, the center clamp bar 102 can be easily and quickly lifted out of the unthreaded openings 108 in which the shafts 106 thereof were received to allow the second belt end 24 to be slid on the web wall 16 of the tool base 14 including the smooth belt guide surface 52 thereof until its leading end edge abuts the end edge of the clamped first belt end 22 so that both belt end edges are centered over the lower plate members 28. The shafts 106 of the removed clamp bar 102 are then threaded into the threaded openings 114 in the serrated outboard portion of the web wall 16 adjacent the belt guide surface 52 and the second belt end 24 is clamped to the web wall 16 in a manner similar to the first belt end 22.

Figure 10:
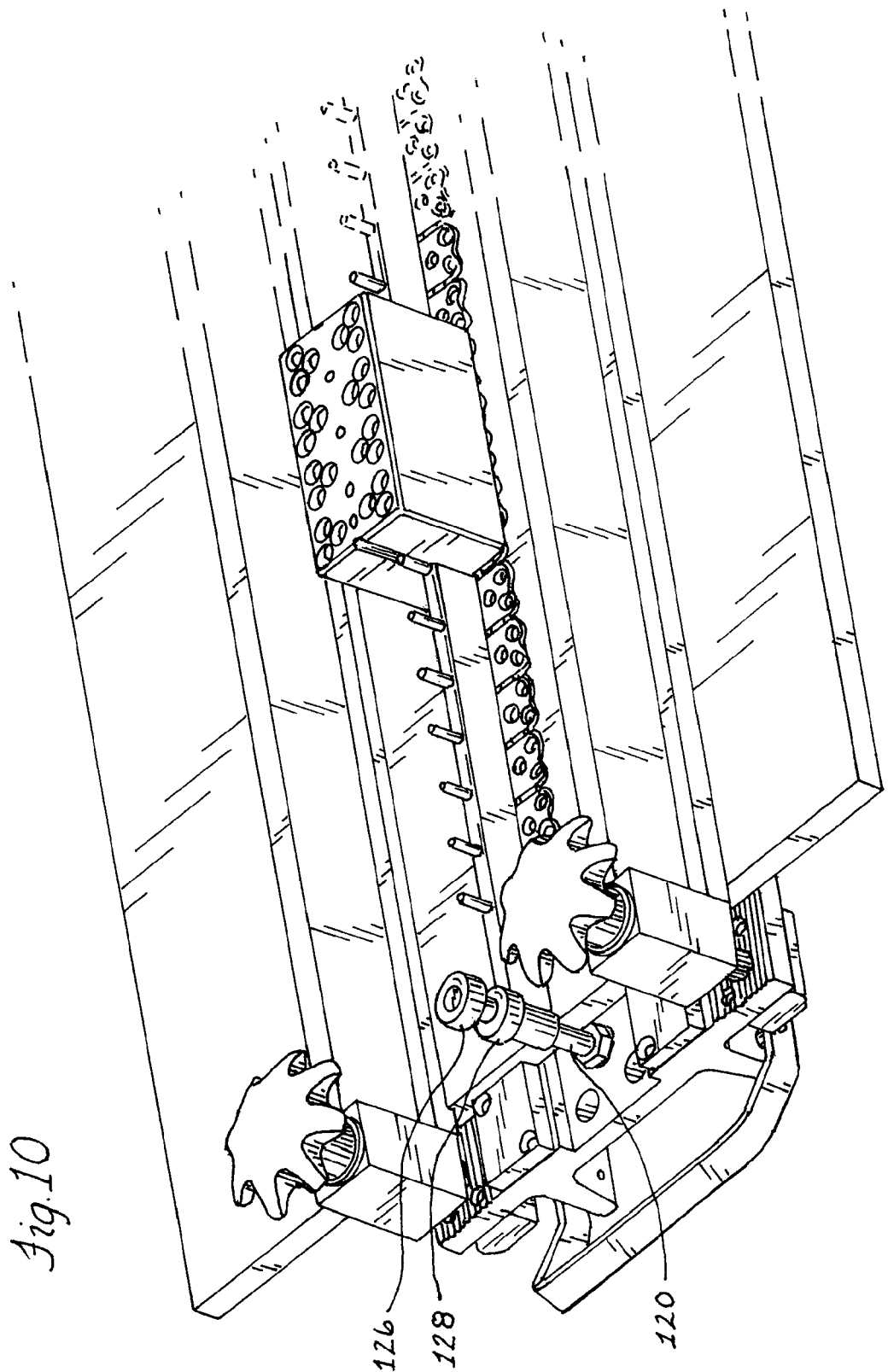
FIG. 10 is a perspective view showing the other belt end in abutment with the first belt end with both belt ends clamped to the tool base, and the alignment bar threaded to the tool base to tightly engage the upper plate fastener members secured thereto with the belt ends, and a guide block removably received on the alignment bar.

After the belt ends 22 and 24 are clamped to the tool base 14, the alignment bar 92 having the upper plate members 40 secured thereto is connected to the web wall 16. This process is significantly easier with the present tool 10 since there are no heavy guide blocks fixed on the bar 92. The splice installer inserts the lower ends of threaded shafts 120 at either end of the lightweight bar 92 into threaded openings 122 at either end of the web wall 16 centered along centerline 16a thereof, as shown in FIG. 10. With the shafts 120 threaded into the openings 122, the upper plate members 40 will be on the upper surfaces of the clamped belt ends 22 and 24 so that rivet receiving apertures 124 thereof are aligned with the rivet receiving apertures 48 of the lower plate members 28 and the openings of the anvil rivet head forming cups 46 thereunder. Next, the installer tightens nuts 126 and 128 on the upper ends of the shafts 120 so that the upper plate members 40 tightly engage against the upper surfaces of the clamped belt ends 22 and 24.

Figure 11:
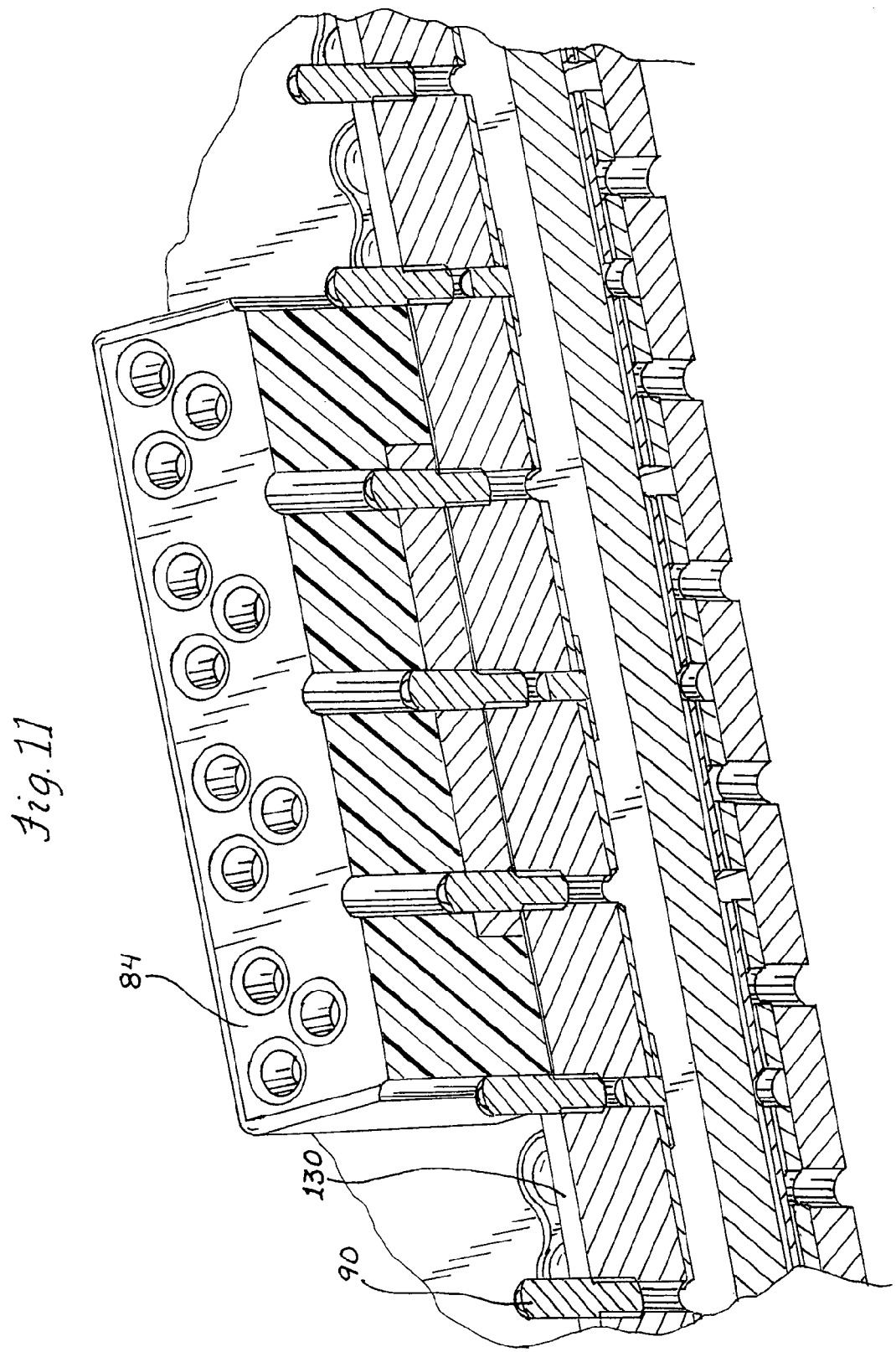
FIG. 11 is a sectioned perspective view showing half of the guide block and alignment bar with the locating posts removably received in the guide block locating bores.

With the upper plate members 40 tightened down onto the belt ends 22 and 24, the belt fastener members 12 are ready to be riveted to the belt ends 22 and 24. Referring to FIGS. 10 and 11, the splice installer uses the illustrated guide block 84 removably mounted on the alignment bar 92 to sequentially rivet sets of four belt fasteners 12 to the belt ends 22 and 24.

After riveting a first set of four belt fasteners 12 to the belt ends 22 and 24, the splice installer indexes the removable guide block 84 along the alignment bar 92 by lifting the guide block 84 off of the locating posts 90 projecting upwardly from upper surface 130 of the alignment bar 92 and placing the guide block 84 back onto the next set of locating posts 90 so that the guide block 84 is aligned over the next set of four belt fasteners 12 to be riveted. This process of indexing the guide block 84 along the alignment bar 92 continues until all of the belt fasteners 12 have been riveted to the belt ends 22 and 24 thereby completing the belt splice installation procedure.

Turning to more of the details, FIGS. 12 and 13 show the alignment bar 92 as including apertures 132 formed in the bottom surface 134 thereof. The retainers 93 can be of a plastic material and have an enlarged, circular head 136 with a central, depending shaft that is sized to be friction fit in the apertures 132. As shown in FIG. 13, a tool such as a hammer or mallet can be used to drive the retainer shaft into one of the bar apertures 132 until the enlarged, retainer head clamps the side of the upper plate member 40 against the bottom surface 134 of the alignment bar 92. As shown in FIG. 7, the upper plate members 40 can have intermediate side notches 138 formed centrally along the length thereof so that the notches 138 of two adjacent plates 40 face each other and form an opening aligned with the bar aperture 132 for receipt of the retainer shaft therethrough. With the shafts of the retainers 93 driven into the apertures 132, the enlarged retainer heads 136 will clamp on the sides of two adjacent fastener plate members 40.

Figure 4:
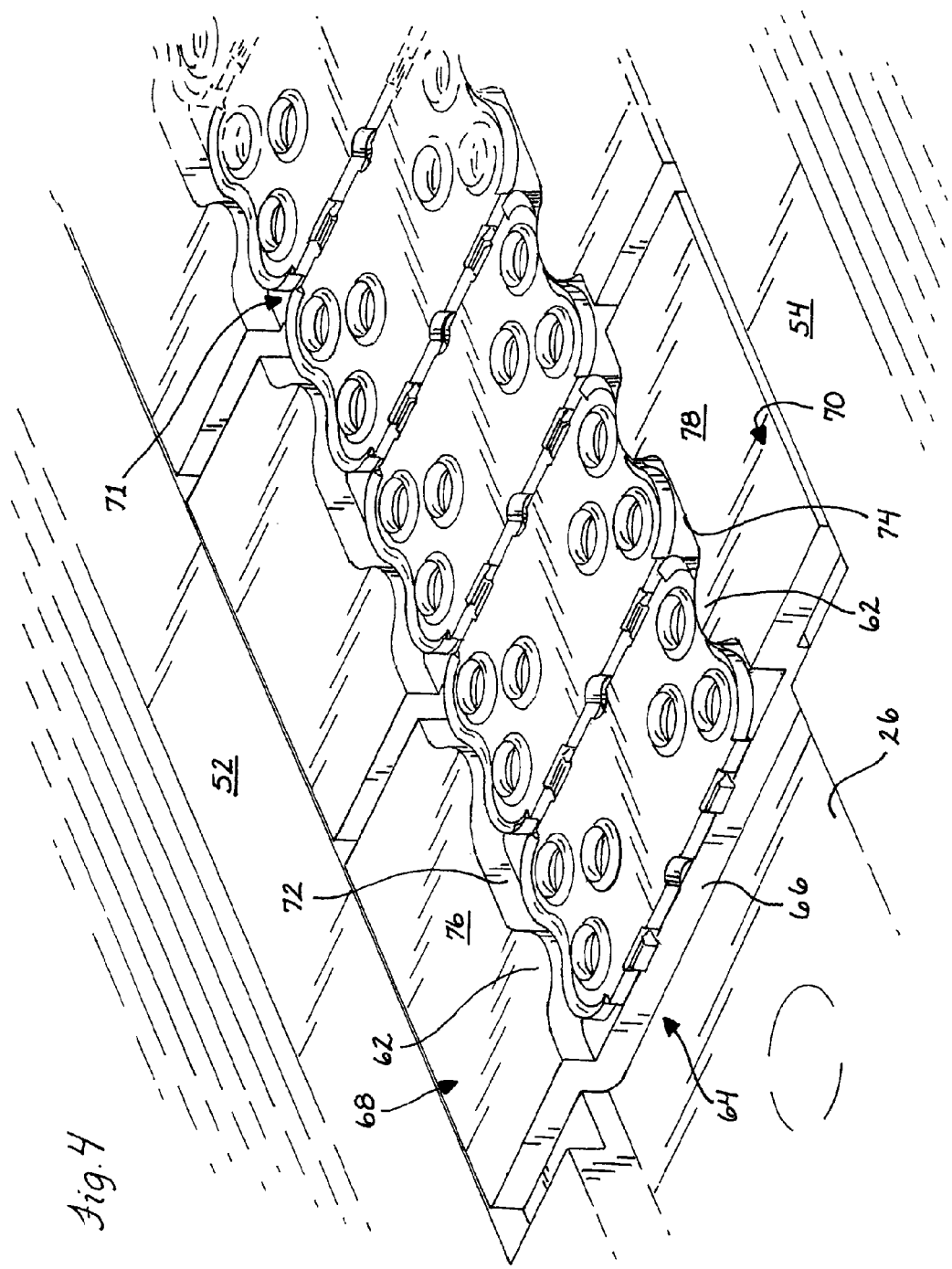
FIG. 4 is an alternative anvil plate having a stepped construction with the locating projections formed integrally therewith.
Figure 14:
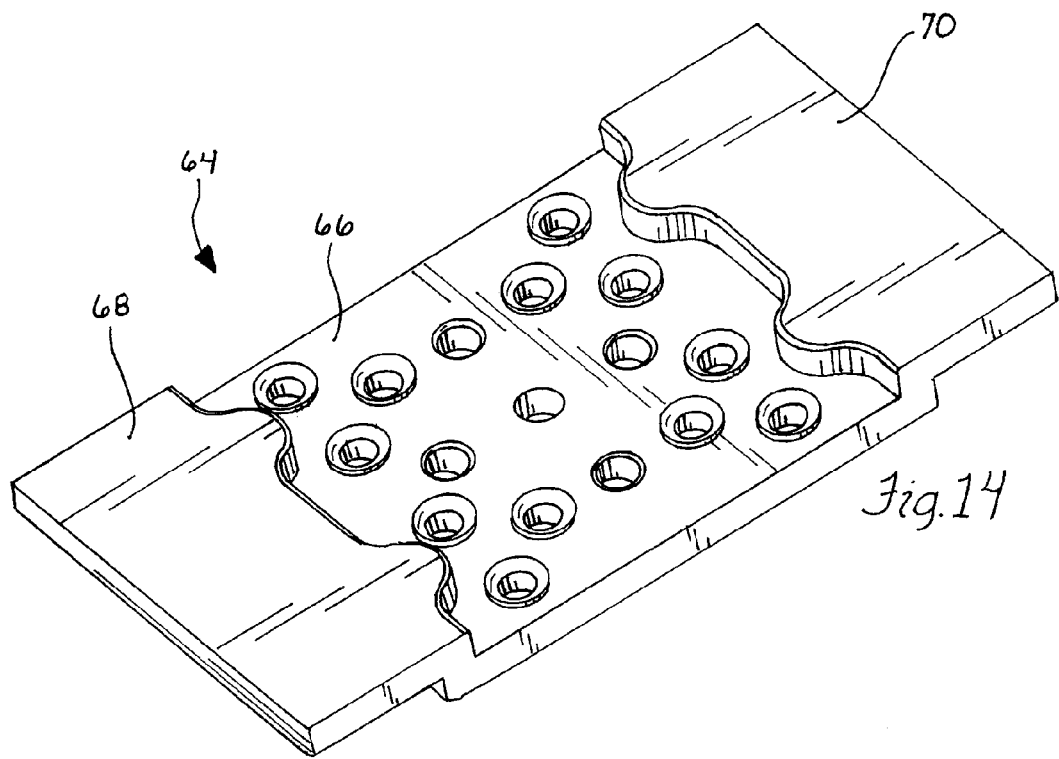
FIG. 14 is a perspective view of the alternative separate anvil plate member of FIG. 4 showing raised rivet head forming cups on a recessed portion of the anvil plate member, and the locating projections formed on a vertical shoulder wall and extending over the anvil plate recessed portion.
Figure 15:
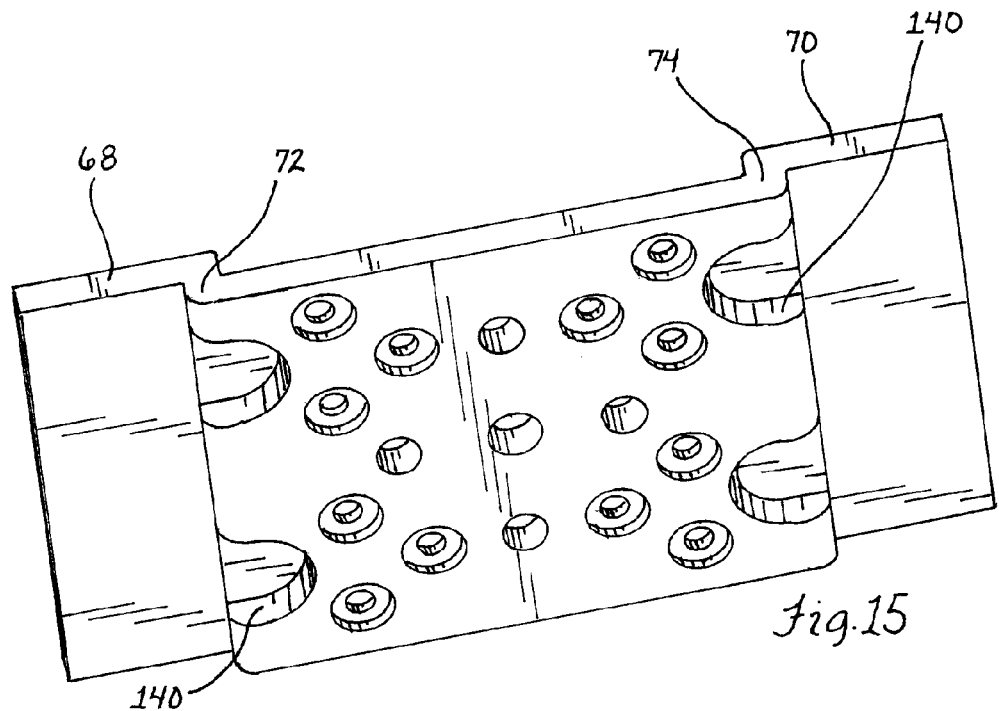
FIG. 15 is a bottom perspective view of the separate anvil plate member of FIG. 14 showing cutouts where the locating projections are punched into the anvil plate member.

FIGS. 14 and 15 show the stepped anvil plate 64 of FIG. 4. As mentioned, forming the locating projections 62 on the stamped anvil plate member 64 is advantageous from a manufacturing standpoint compared to extruding the channel base member 14 and then having to go back and machine the locating projections 42 therein. As such, the stamped anvil plate 64 can be of substantially constant thickness. To this end, forming the locating projections 62 involves punching these into the side wall portions 72 and 74 and the lower anvil portion 66 so as to leave cavities 140 in the underside thereof, as can be seen in FIG. 15.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A system for splicing conveyor belt ends together, the system comprising:
    conveyor belt fasteners having fastener members including scalloped end edges with alternating projections and recesses;
    an applicator tool for securing conveyor belt ends together;
    a base of the applicator tool;
    an upwardly facing, elongate recess extending lengthwise along the base sized to fit the belt fastener members therein; and
    locating projections extending into the elongate recess on either side thereof configured to be fit into the edge recesses and between the edge projections of the belt fastener members for keeping the fastener members substantially stationary as the belt fasteners are secured to the belt ends, wherein the conveyor belt fasteners include upper plates and lower plates with the lower plates being the belt fastener members having the scalloped end edges and snugly fitting in the elongate recess, and an elongate alignment bar to which the upper plates are secured for being mounted to the base to position the upper plates in alignment over the lower plates in the elongate recess with the belt ends therebetween.

2. A system for splicing conveyor belt ends together, the system comprising:
    conveyor belt fasteners having fastener members including scalloped end edges with alternating projections and recesses;
    an applicator tool for securing conveyor belt ends together;
    a base of the applicator tool; an upwardly facing, elongate recess extending lengthwise along the base sized to fit the belt fastener members therein; and
    locating projections extending into the elongate recess on either side thereof configured to be fit into the edge recesses and between the edge projections of the belt fastener members for keeping the fastener members substantially stationary as the belt fasteners are secured to the belt ends, wherein the elongate recess has substantially vertical side walls on either side thereof with the locating projections formed on the side walls to extend into the elongate recess generally transverse to the lengthwise extent thereof, and the elongate recess includes a bottom anvil surface and the recess including the bottom anvil surface is formed integrally with a separate stepped anvil plate including the substantially vertical side walls and the locating projections formed thereon.

3. A system for splicing conveyor belt ends together, the system comprising:
    conveyor belt fasteners having fastener members including scalloped end edges with alternating projections and recesses;
    an applicator tool for securing conveyor belt ends together;
    a base of the applicator tool;
    an upwardly facing, elongate recess extending lengthwise along the base sized to fit the belt fastener members therein; and
    locating projections extending into the elongate recess on either side thereof configured to be fit into the edge recesses and between the edge projections of the belt fastener members for keeping the fastener members substantially stationary as the belt fasteners are secured to the belt ends, wherein the elongate recess includes a bottom anvil surface having rivet head forming cups thereon aligned with rivet receiving apertures of the belt fasteners.

4. The system of claim 3 wherein the bottom anvil surface is formed on a separate anvil plate that is secured in the elongate recess, and edge recesses on either side edge of the anvil plate configured to receive the locating projections therein.

5. A system for splicing conveyor belt ends together, the system comprising:
    conveyor belt fasteners having fastener members including scalloped end edges with alternating projections and recesses;
    an applicator tool for securing conveyor belt ends together;
    a base of the applicator tool;
    an upwardly facing, elongate recess extending lengthwise along the base sized to fit the belt fastener members therein; and
locating projections extending into the elongate recess on either side thereof configured to be fit into the edge recesses and between the edge projections of the belt fastener members for keeping the fastener members substantially stationary as the belt fasteners are secured to the belt ends, wherein the base includes raised guide surfaces adjacent either side of the elongate recess to allow the belt ends to slide on the guide surfaces and over the belt fastener members without interference from the belt fastener members in the elongate recess.

6. The system of claim 5 including an elongate alignment bar having alignment posts spaced therealong, and a guide block for guiding rivets driven through apertures of the fastener plates and the belt ends and having locating bores with the posts sized to be in clearance with the bores to allow the guide block to be easily placed on the posts and removed therefrom for repositioning of the block along the bar to rivet all of the belt fasteners to the belt ends using the same guide block.

7. The system of claim 5 wherein the elongate recess has substantially vertical side walls on either side thereof with the locating projections formed on the side walls to extend into the elongate recess generally transverse to the lengthwise extent thereof.

8. The system of claim 7 wherein the elongate recess, the vertical side walls and the locating projections are integrally formed with the base.

* * * * *